United States Patent
Donjon

(10) Patent No.: US 12,185,059 B2
(45) Date of Patent: Dec. 31, 2024

(54) PROCESSOR

(71) Applicant: NXP USA, Inc., Austin, TX (US)

(72) Inventor: Aurelie Donjon, Antibes (FR)

(73) Assignee: NXP USA, Inc., Austin, TX (US)

( * ) Notice: Subject to any disclaimer, the term of this patent is extended or adjusted under 35 U.S.C. 154(b) by 228 days.

(21) Appl. No.: 18/061,057

(22) Filed: Dec. 2, 2022

(65) Prior Publication Data
US 2023/0247350 A1    Aug. 3, 2023

(30) Foreign Application Priority Data

Dec. 16, 2021 (EP) .................................. 21306803

(51) Int. Cl.
*H04R 3/00* (2006.01)
*H04R 1/40* (2006.01)

(52) U.S. Cl.
CPC ............. *H04R 1/406* (2013.01); *H04R 3/005* (2013.01); *H04R 2430/20* (2013.01)

(58) Field of Classification Search
CPC ................................. H04R 1/406; H04R 3/005
See application file for complete search history.

(56) References Cited

U.S. PATENT DOCUMENTS

| | | | | |
|---|---|---|---|---|
| 9,989,633 B1 * | 6/2018 | Pandey | ..................... | G01S 3/32 |
| 10,939,201 B2 | 3/2021 | Stachurski et al. | | |
| 11,545,172 B1 * | 1/2023 | Chu | ........................ | G10L 25/21 |
| 11,915,698 B1 * | 2/2024 | Lee | ........................... | G10L 15/08 |
| 12,003,948 B1 * | 6/2024 | Russell | ..................... | G01S 3/802 |
| 2019/0289420 A1 * | 9/2019 | Makinen | ................. | H04R 3/005 |
| 2020/0145776 A1 * | 5/2020 | Herre | ...................... | G06F 3/011 |
| 2020/0154229 A1 * | 5/2020 | Habets | ................... | G10L 19/008 |
| 2021/0302987 A1 * | 9/2021 | Chebiyyam | ............. | G01S 3/802 |
| 2021/0302988 A1 * | 9/2021 | Chebiyyam | ........... | G01S 7/4861 |

OTHER PUBLICATIONS

Blandin et al.: "Multi-source TDOA estimation in reverberant audio using angular spectra and clustering", Signal Processing, Elsevier, 2012, 92, HAL Id: inria-00630994, Submitted on Mar. 6, 2012, pp. 1950-1960.

(Continued)

*Primary Examiner* — Simon King

(57) ABSTRACT

A processor is configured to receive a plurality of sounds signals from a respective plurality of microphones. One or more localization algorithms is applied to the received plurality of sound signals to determine a plurality of source directions. A plurality of tracking directions is determined based on current values for the determined plurality of source directions and previous values for the determined plurality of source directions. An onset detection algorithm is applied to the received plurality of sound signals, and in response to detecting an onset, the processor is configured to determine an onset direction that represents the direction from the microphones to the source of the detected onset. A score is attributed to each of the determined plurality of tracking directions based on any determined onset directions and the one of the determined plurality of tracking directions that has the highest score is provided as a direction-output-signal.

18 Claims, 7 Drawing Sheets

(56) References Cited

OTHER PUBLICATIONS

Braun et al.: "Acoustic Localization Using Spatial Probability in Noisy and Reverberant Environments", 2019 IEEE Workshop on Applications of Signal Processing to Audio and Acoustics, Oct. 20-23, 2019, New Paltz, NY, pp. 348-352.
Brendel et al.: "STFT Bin Selection for Localization Algorithms based on the Sparsity of Speech Signal Spectra", Euronoise 2018 Crete, Euronoise 2018—Conference Proceedings, pp. 2561-2568.
Hadad et al.: "Multi-Speaker Direction of Arrival Estimation using SRP-PHAT Algorithm with a Weighted Histogram", 2018 ICSEE International Conference on the Science of Electrical Engineering, pp. 2-5.
Hioka et al.: "A Tracking Algorithm of Speaker Direction Using Microphones Located At Vertices of Equilateral-Triangle", Signal Processing Lab., School of Integrated Design Engineering, Keio University, Hiyoshi 3-14-1, Kohoku-ku, Yokohama, Kanagawa 223-8522, Japan, pp. 1983-1986.
Rascon et al.: "Lightweight multi-DOA tracking of mobile speech sources", Rascon et al. EURASIP Journal on Audio, Speech, and Music Processing (2015) 2015:11, DOI 10.1186/s13636-015-0055-8, pp. 1-16.
Wang et al.: "A robust DOA estimation method for a linear microphone array under reverberant and noisy environments", Author Key Laboratory of Modern Acoustics, Institute of Advanced Artificial Intelligence in Nanjing, Nanjing 210014, China, pp. 1-7.
Wohlmayr et al.: "Joint Position-Pitch Extraction from Multichannel Audio", Interspeech 2007, Aug. 27-31, Antwerp, Belgium, pp. 1629-1632.

\* cited by examiner

PROCESSOR

CROSS-REFERENCE TO RELATED APPLICATIONS

This application claims the priority under 35 U.S.C. § 119 of European Patent application no. 21306803.4, filed on 16 Dec. 2021, the content of which are incorporated by reference herein.

FIELD

The present disclosure relates to processors that receive sounds signals and determine a direction to a target (human) speaker, for example such that the direction can be used by a beamformer to focus on the target speaker. Furthermore, the output of the beamformer can be used to facilitate fast wake word detection.

SUMMARY

According to a first aspect of the present disclosure there is provided a processor configured to:
  receive a plurality of sounds signals from a respective plurality of microphones;
  apply one or more localization algorithms to the received plurality of sound signals in order to determine a plurality of source directions, wherein the plurality of source directions each represent a direction from the microphones to the source of a detected sound;
  determine a plurality of tracking directions based on: current values for the determined plurality of source directions; and previous values for the determined plurality of source directions;
  apply an onset detection algorithm to the received plurality of sound signals, and in response to detecting an onset the processor is configured to determine an onset direction that represents the direction from the microphones to the source of the detected onset;
  attribute a score to each of the determined plurality of tracking directions based on any determined onset directions; and
  provide the one of the determined plurality of tracking directions that has the highest score as a direction-output-signal.

Advantageously such a processor can quickly provide a tracking direction that is associated with a detected onset as the direction-output-signal, even if the source direction that corresponds to the detected onset is not the dominant source.

In one or more embodiments, the processor is configured to:
  attribute a first score to a tracking direction that is associated with a determined onset direction; and
  attribute a second score to a tracking direction that is not associated with a determined onset direction, wherein the first score is higher than the second score.

In one or more embodiments, the direction-output-signal is for setting a steering direction for a beamformer.

In one or more embodiments, the processor further comprises:
  a beamformer that is configured to combine the received plurality of sound signals such that they are constructively combined in a direction that corresponds to the direction-output-signal in order to provide a beamformed-output-signal.

In one or more embodiments, the processor further comprises:
  a wake word detector that is configured to detect a wake word in the beamformed-output-signal.

In one or more embodiments, the processor is configured to:
  fix the value of the direction-output-signal for at least a minimum period of time in response to the wake word detector detecting a wake word.

In one or more embodiments, the one or more localization algorithms are configured to:
  determine cross power spectral density of the sound signals captured by pairs of the microphones; and
  determine the plurality of source directions based on the minimum distance between observed and expected phase differences.

In one or more embodiments, the processor is configured to apply the one or more localization algorithms to a defined frequency band of the plurality of sound signals in order to determine the plurality of source directions.

In one or more embodiments, the processor is configured to attribute the score to each of the determined plurality of tracking directions by:
  determining a state for each tracking direction based on one or more of:
    the presence or absence of an onset that is detected at an onset direction that corresponds to the tracking direction;
    a strength-value associated with the tracking direction;
    the stability of a source direction that is associated with the tracking direction;
    the duration for which a tracking direction has been active and/or the spectral components of the sound signals in the tracking direction; and
    the presence or absence of a wake word in a beamformed-output-signal from a beamformer that is steered in line with the direction-output-signal;
  wherein each state is associated with a score.

In one or more embodiments, the processor is configured to:
  adjust each of the plurality of tracking directions by a respective change-amount for a subsequently determined plurality of source directions, and
  determine the respective change-amounts based on a difference between each of the subsequently determined plurality of source directions and a corresponding one of the plurality of tracking directions in order to bring each of the tracking directions closer to the corresponding subsequently determined source directions.

In one or more embodiments, the processor is configured to:
  determine the respective change-amounts based on:
    the difference between each of the subsequently determined plurality of source directions and the corresponding one of the plurality of tracking directions; and
    any determined onset direction that is associated with one of the source directions.

In one or more embodiments, the one or more localization algorithms are configured to determine a strength-value associated with each of the plurality of source directions. The processor may be configured to:
  adjust each of the plurality of tracking directions by a respective change-amount for a subsequently determined plurality of source directions; and determine the respective change-amounts based on:
a difference between each of the subsequently determined plurality of source directions and a corresponding one of the plurality of tracking directions; and
the strength-value corresponding with the associated one of the subsequently determined plurality of source directions.

In one or more embodiments, the processor is configured to:
reduce the score for a determined tracking direction if it has been unchanged for at least a minimum duration in a preceding period of time.

In one or more embodiments, the processor is further configured to provide the one of the determined plurality of tracking directions that has the lowest score as a second-direction-output-signal. The beamformer may be further configured to combine the received plurality of sound signals such that they are destructively combined in the direction that correspond to the second-direction-output-signal in order to provide the beamformed-output-signal.

According to a further aspect of the present disclosure, there is provided a method comprising:
receiving a plurality of sounds signals from a respective plurality of microphones;
applying one or more localization algorithms to the received plurality of sound signals in order to determine a plurality of source directions, wherein the plurality of source directions each represent a direction from the microphones to the source of a detected sound;
determining a plurality of tracking directions based on: current values for the determined plurality of source directions; and previous values for the determined plurality of source directions;
applying a speech onset detection algorithm to the received plurality of sound signals and, in response to detecting a speech onset, determining an onset direction that represents the direction from the microphones to the source of the detected speech onset;
attributing a score to each of the determined plurality of tracking directions based on any determined onset directions; and
providing the one of the determined plurality of tracking directions that has the highest score as a direction-output-signal.

There is also disclosed a processor configured to:
receive a plurality of sounds signals from a respective plurality of microphones;
apply one or more localization algorithms to the received plurality of sound signals in order to determine a plurality of source directions, wherein the plurality of source directions each represent a direction from the microphones to the source of a detected sound;
apply an onset detection algorithm to the received plurality of sound signals, and in response to detecting an onset the processor is configured to determine an onset direction that represents the direction from the microphones to the source of the detected onset;
attribute a score to each of the determined plurality of source directions based on any determined onset directions; and
provide the one of the determined plurality of source directions that has the highest score as a direction-output-signal.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
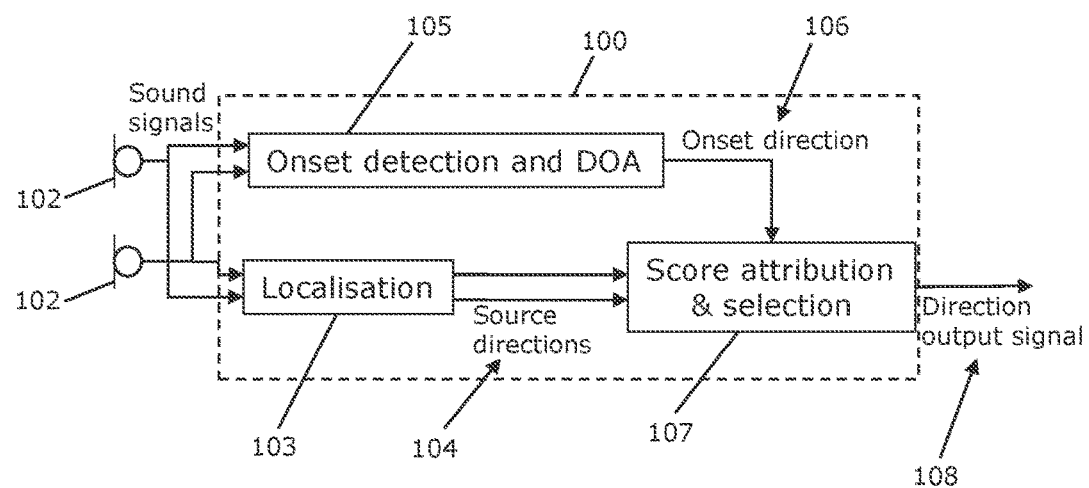
FIG. 1 shows an example embodiment of a processor.

Deep learning technologies have led to improvements of Automatic Speech Recognition (ASR) performances. Still, recognition of far-field speech remains challenging in the presence of noise, reverberation and interferers. Use of a microphone array can enable sounds to be spatially filtered based on their Direction Of Arrival (DOA). For wake word (WW) detection, multichannel speech enhancement can benefit from accurate real-time DOA estimation of the target (human) speaker on a short speech burst in a noisy environment. Examples disclosed herein relate to DOA estimation that can learn about the sound environment and identify onset of a speech utterance in order to detect a target speaker based on such an acoustic event, even if the target speaker is not the dominant source of sound in the environment. The output target speaker DOA allows a spatial filter to steer into the direction of the target speaker in challenging acoustic environments. With a focus on acoustic events, the proposed DOA is able to localize the target speaker based on a short keyword speech signal at low Signal to Noise Ratios (SNR), in a reverberant environment, in the presence of both stationary and non-stationary noise, and with an enhanced resolution.

Extracting speech signal from a microphone signal in a mono-channel speech enhancement can be challenging in the presence of some non-stationary voice-like noise (e.g., music, TV), which can be encountered in a home environment. Multi-channel speech enhancement can make use of spatial information to filter the sound signals based on their localization. Spatial filtering introduces relatively few distortions on the enhanced signal, which is a benefit for ASR, Even if post-filtering is needed to increase the noise reduction, a combination with spatial filtering can allow for a better balance between noise reduction and speech distortion so that ASR performances may be improved without the need to retrain the ASR back-end on the enhanced speech.

The performance of a spatial filter, such as a Generalized Sidelobe Canceller (GSC) beamformer, is dependent on the accuracy of the Direction Of Arrival (DOA) estimator.

A DOA block can estimate the localization angles of different sound sources present in a room. When the keyword/wake word is pronounced, the DOA block should output one angle, among all estimated sound sources angles of arrival, that corresponds to the localization of the target (human) speaker that is stating the keyword/wake word. The beamformer can then steer into the direction of the target speaker thereby providing an enhanced keyword to the ASR.

Small smart devices can benefit from efficient, low-latency, wake word detection that have low processing delays and a low computational load. In addition, a keyword/wake word may occur at a localization in space without any prior speech occurring at that place. In which case, the DOA estimation of the target speaker is limited to that keyword/wake word duration.

Such smart devices (for instance smart speakers and smart phones) are often used close to a strong interferer sound source (such as a television or radio). As a consequence, localization of the target (human) speaker is needed at low SNRs and in the presence of both stationary and non-stationary noise. As smart devices are used in far-field, localization should also be robust enough to reverberation.

DOA estimation methods, such as beamforming-based and parametric subspace-based algorithms, can suffer from a decrease of performances when the Signal to Noise Ratio (SNR) decreases or when the number of snapshots decreases or when the number of microphones decreases. For localization, these methods can perform averaging across a narrowband spectrum and focus on the dominant sound source, which can reduce the DOA resolution. Reduced DOA resolution can lead to target signal distortion and decreased noise reduction at a subsequent beamforming stage. Such methods can also incur a delay in detection if a minimum amount of speech statistics are required, or can even result in the detection being missed completely at low SNRs.

Further still, reverberation can create multi-path propagation, which can lead to incorrect source angle detection in the presence of strong reflections. The presence of multi-path propagation can also require decorrelation for sub-space methods to counter the degradation of performance due to coherent signals.

While different DOA estimation algorithms, e. g. based on SRP-PHAT, MUSIC, SBL and more recently Machine Learning (ML) methods, try to resolve source localization ambiguity, there is still the need to detect a desired DOA among all source DOAs, whereby the desired DOA corresponds to the target speaker pronouncing the keyword. Without any prior knowledge about the localization/position of the target speaker, and without a model of the target speaker, this detection becomes challenging in reverberant environment at low SNRs, particularly in the presence of non-stationary noise.

To localize speech sources, some algorithms focus on the dominant source, which can require favourable SNRs. They can also combine Voice Activity Detection (VAD) with DOA estimation, which is then subjected to the addition of VAD errors. It is also known that VAD has limited performance in non-stationary voiced-like noise such as TV and music sources often present in the home environment.

As will be discussed below, examples disclosed herein can perform target speaker DOA estimation that learns about the acoustic environment around the microphones and efficiently localizes the target speaker by tracking an onset in a challenging acoustic environment, without the need of a VAD and without the need of dereverberation, FIG. 1 shows an example embodiment of a processor 100. The processor 100 receives a plurality of sounds signals from a respective plurality of microphones 102. The processor 100 provides a direction-output-signal 108, which, as will be discussed in detail below, which can represent a direction from the microphones 102 to a sound source that is expected to be a target (human) speaker. The direction-output-signal 108 can then be used such that a beamformer is directed in that direction and a wake word can more readily be detected in the output signalling from the beamformer if the speaker says the wake word. Optionally, the direction-output-signal 108 can include a second output value, which represents a direction from the microphones 102 to a detected source of noise. In which case, the beamformer can be controlled such that a null is provided in that direction and a wake word can even more readily be detected from the steering direction.

The processor 100 includes a localization module 103. The localization module 103 applies one or more localization algorithms to the received plurality of sound signals in order to determine a plurality of source directions 104, wherein the plurality of source directions 104 each represent a direction from the microphones to the source of a detected sound. As will be discussed in detail below, determining more than source direction 104 contributes to the ability of the processor 100 to quickly detect speech from a sound source that is not the dominant sound source.

The one or more localization algorithms that are applied by the localization module 103 can estimate the cross-correlation spectrum to determine the phase differences (and therefore different angles of arrival, as is known in the art of sound source localization). The localization module 103 can then determine the plurality of source directions 104 based on the highest peaks of the angular spectrum. In this way, the localization module 103 can determine cross power spectral density of the sound signals captured by pairs of microphones; and determine the plurality of source directions based on the minimum distance between observed and expected phase differences. Examples of known localization algorithms that can be applied by the localization module 103 include: Steered-Response Power Phase Transform (SRP-PHAT) and Generalized Cross-Correlation Phase Transform (GCC-PHAT) DOA. More generally, the localization algorithms can include any known cross-spectrum based methods.

The processor 100 also includes an onset detection and DOA module 105. The onset detection and DOA module 105 applies an onset detection algorithm to the received plurality of sound signals. In response to detecting an onset, the onset detection and DOA module 105 determines an onset direction that represents the direction from the microphones 102 to the source of the detected onset. Such onset detection, including speech onset detection, and DOA algorithms are well-known in the art.

The processor 100 also includes a module 107 that attributes a score to each of the determined plurality of source directions 104 based on any determined onset directions 106, and also provides one of the determined plurality of source directions 104 as a direction-output-signal 108 based on the attributed scores. As will be discussed below, if an onset is detected in a direction that corresponds to one of the source directions 104, then that source direction 104 can quickly be provided as the direction-output-signal 108. Advantageously, this can be achieved even if the source direction 104 that corresponds to the detected onset is not the dominant source. A specific example is provided below to illustrate this advantageous processing. Quickly providing a direction-output-signal 108 that accurately corresponds to the target speaker can increase the likelihood with which a downstream wake word detector will correctly recognise a wake word in the target speaker's speech.

In the example of FIG. 1, the module 107 attributes a score directly to each of the determined plurality of source directions 104. In other examples, as discussed below, the processor can perform tracking of the source directions 104 in order to provide tracking directions. Such a processor can then attribute scores to the tracking directions, thereby indirectly attributing scores to the source directions.

In some examples, the module 107 can: attribute a first score to a source direction that is associated with a determined onset direction; and attribute a second score to a source direction that is not associated with a determined onset direction, wherein the first score is higher than the second score. The module 107 can then provide the determined source direction that has the highest attributed score as the direction-output-signal 108. This is one way in which the module 107 can quickly and efficiently provide a direction-output-signal 108 that is directed towards a target speaker shortly after she or he starts talking.

Figure 2:
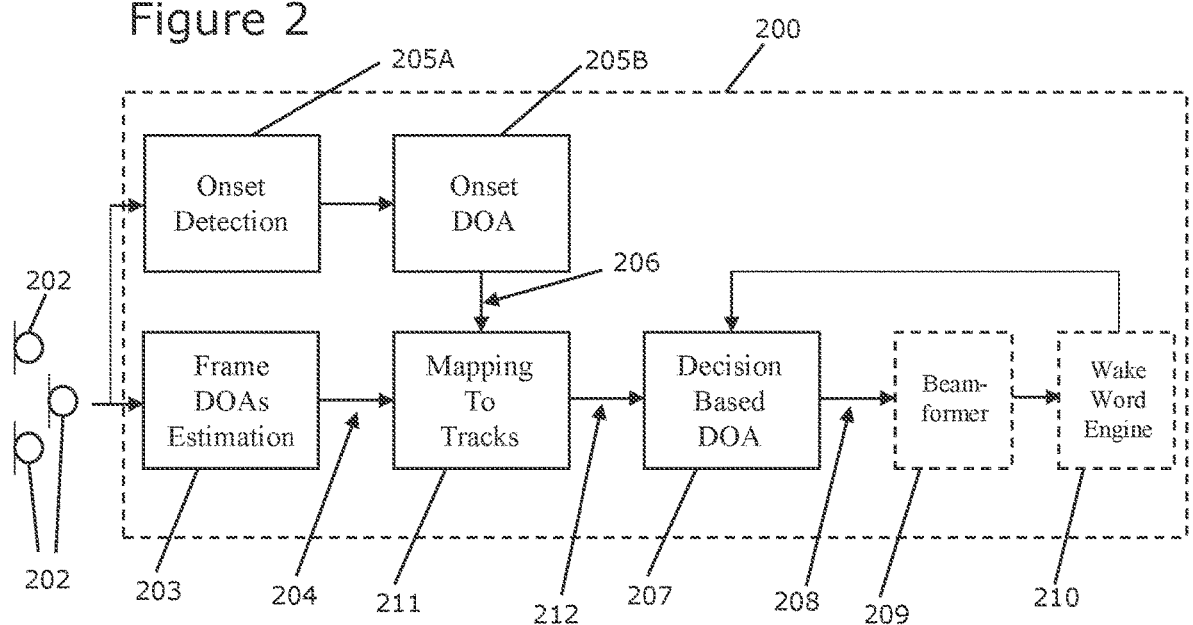
FIG. 2 shows another example embodiment of a processor.

FIG. 2 shows another example embodiment of a processor 200. Features of FIG. 2 that are also shown in FIG. 1 have been given corresponding reference numbers in the 200 series and will not necessarily be described again with reference to FIG. 2.

In this example, a microphone array is used that includes at least 2 microphones 202 for DOA estimation. As shown in FIG. 2, a planar array of two microphones 202 with a third microphone 202 can allow front-back ambiguity to be resolved. In some applications the number of available microphones 202 may be limited, especially if the target application is a low cost, small size, device such as a smart speaker or a smart phone. Example figures that given in this document are obtained from real MEMS (micro-electromechanical system) microphones array recordings, and are purely for illustration.

In FIG. 2, the localization module of FIG. 1 is implemented as a frame based DOA estimator 203, which provides a plurality of source directions as frame based DOAs 204. In this example, the frame based DOAs 204 are computed based on the sum of the angular spectrums of the sounds signals provided by pairs of microphones 202 with time shift alignment between the pairs, denoted as integrated cross spectrum. Considering a grid search of N angles, angular spectrum is K sparse where K is much less than N. The K angles are DOAs corresponding to K sound sources. Use of such a grid-based phase search function measures the similarity between the cross spectrum phase due to the DOA of one source and the theoretical phase it should have for a source coming from each steering direction of the grid.

For each audio frame (for example a 10 ms frame for speech processing), the maximum of the integrated cross spectrum over the grid angles give the DOA per frequency bin, that is the narrowband DOA. Whereas peaks of the average across frequency bins gives the wideband DOAs of the sound sources. The frame based DOA estimator 203 searches for a maximum number of I wideband DOAs (also referred to as frame based DOAs 204), where I is greater than 1.

The processor 200 of FIG. 2 also includes a tracking module 211 that uniquely maps the frame based DOAs 204 to different I tracks such that the tracking module 211 can effectively learn about the current acoustic environment and the processor 200 can provide a direction-output-signal 208 that more quickly and accurately reflects the direction to a target speaker. These different I tracks are provided as a plurality of tracking directions 212 by the tracking module 211. As will be discussed below, the tracking module 211 can use peaks from a phase search function in time for mapping such as to smoothly adapt the tracking directions 212 towards an estimated frame wideband DOAs of the corresponding tracked sources.

In addition, the processor 200 of FIG. 2 includes an onset detection module 205A and an onset DOA module 205B. The output of the onset DOA module 205B is a determined onset direction 206, which as discussed above represents the direction from the microphones 202 to the source of a detected onset.

The onset detection module 205A identifies frequency bins that correspond to the onset of acoustic events, as is known in the art. If an onset is detected, the onset DOA module 205B in this example accumulates the DOAs of the onset frequency bins into one histogram with theta grid bins, and provides the maximum as the determined onset direction 206.

In FIG. 2, the module that attributes a score to each of the determined plurality of tracking directions 212 is implemented as a decision based DOA module 207.

The decision based DOA module 207 can attribute a score to each of the determined plurality of tracking directions 212 by determining a state for each tracking direction 212, wherein each state is associated with a score. States that are considered more likely to correspond to a target speaker (and therefore higher priority) can be associated with higher scores than states that are considered less likely to correspond to a target speaker (and therefore lower priority). The decision based DOA module 207 can determine the state for each tracking direction based on one or more of:

- the presence or absence of an onset that is detected at an onset direction that corresponds to the tracking direction. If an onset is detected at a tracking direction, it can be determined as having a status of "onset track", which can be associated with a relatively high score;
- a strength-value (discussed in detail below) associated with the tracking direction 212, which can include a current strength-value for a corresponding source direction 204 and/or previous strength-values for source directions 204 that correspond to the tracking direction 212. For instance, if a tracking direction has a high strength-value (i.e. greater than a threshold, or the highest strength-value of all the peaks associated with the source directions 204) it can be determined as having a status of "dominant", which can be associated with a medium score. I.e. a score that is not as high as the score for a tracking direction that is associated with an onset or a detected wake word, but is higher than the score for a tracking direction that is expected to be noisy or free;

the stability of a source direction 204 that is associated with the tracking direction 212. For instance if a source/tracking direction is unstable it can be determined as having a status of "free", which can be associated with a relatively low score;

the duration for which a tracking direction has been active and/or the spectral components of the sound signals in the tracking direction. For instance if a tracking direction has been constantly active and spatially stationary for some time (without wake word detected), or spectrally stationary (and therefore not a speech source) then it be determined as having a status of "noisy", which can be associated with a relatively low score; and the presence or absence of a wake word in the beamformed-output-signal from a beamformer 209 that is steered in line with the direction-output-signal 208. If a wake word is detected, the associated tracking direction 212 can be determined as having a status of "wake word detected", at least for a predetermined period of time, which can be associated with a very high score (in some examples, the highest score possible).

In some examples, decision based DOA module 207 can block/fix the state of a tracking direction 212. For instance, the state can be fixed (such that it cannot be changed for at least a predetermined period of time) if: a dominant track has just changed to an onset track, in which case a time out on that tracking direction 212 can be implemented such that it stays as the direction-output-signal 208 for at least a minimum period of time; or a wake word is detected on the tracking direction 212, in which case the direction-output-signal 208 should stay as that tracking direction 212 for some time; or in a release state (the sound source is not detected by the frame based DOA estimator 203 anymore), in which case the decision based DOA module 207 can progressively release. the tracking direction to a free state (time waiting for sound source pause).

With a decision-based approach, the decision based DOA module 207 outputs one of the I tracking directions 212 as the direction-output-signal 208 for setting a steering direction of a beamformer 209. As is known in the art, the beamformer 209 then enhances incoming signals from the direction that is identified by the direction-output-signal 208.

In this example, the beamformer 209 combines the received plurality of sound signals such that they are constructively combined in a direction that corresponds to the direction-output-signal 208 in order to provide a beamformed-output-signal. In this way, the beamformer 209 can be focused in a direction that corresponds to the tracking direction 212 that is attributed the highest score.

In an additional example, the beamformer 209 can combine the received plurality of sound signals such that they are destructively combined in a direction that corresponds to a second-direction-output-signal, which is assumed to correspond to a tracked interferer, in order to provide a further enhanced beamformed-output-signal. This can be advantageous where the decision based DOA module 207 provides a second-direction-output-signal based on the tracking direction 212 that has the lowest score, such that the beamformer 209 can provide a null in that direction to reduce the influence of a sound source that has been identified as a noise sound source.

The processor is this example also includes a wake word detector 210 that can detect a wake word in the beamformed-output-signal. As will be discussed in more detail below, the decision based DOA module 207 can fix the value of the direction-output-signal 208 for at least a minimum period of time in response to the wake word detector 210 detecting a wake word (as illustrated by the feedback arrow that is shown in FIG. 2).

As discussed elsewhere in this document, the decision based DOA module 207 can give priority to the determined onset direction 206 by attributing a high score to a tracking direction 212 that is associated with the detected onset. The tracking module 211 can map the determined onset direction 206 (as determined by the onset DOA module 205B) to an estimated frame wideband DOA (i.e. one of the source directions 204 provided by the frame based DOA estimator 203). Alternatively, the tracking module 211 can provide a tracking direction 212 independently of the received source directions 204. In some examples, the decision based DOA module 207 can provide the determined onset direction 206 as the direction-output-signal 208 for steering the direction of the beamformer 209 unless it is mapped to a tracking direction 212 that is identified as having a low probability that it corresponds to a target speaker and/or unless there is a tracking direction 212 for which a wake word has recently been detected and the determined onset direction 206 is not mapped to it. In this way, the decision based DOA module 207 can wait on a tracking direction following the detection of a wake word in the expectation that there will be a subsequent speech request or voice command from that direction.

In some examples, the tracking module 211 can determine a plurality of tracking directions 212 based on: current values for the determined plurality of source directions 204; and previous values for the determined plurality of source directions 204. This can enable the tracking module to take into account historical values of the determined source directions 204 such that it can effectively learn about the acoustic environment in the vicinity of the microphones 202. The decision based DOA module 207 can then attribute a score to each of the determined plurality of tracking directions 212 based on any determined onset directions 206, and provide one of the determined plurality of tracking directions 212 as the direction-output-signal 208 based on the attributed scores.

Optionally, the tracking module 211 can adjust each of the plurality of tracking directions 212 by a respective change-amount for a subsequently determined plurality of source directions 204. In this way, the tracking directions 212 can be updated over time such that they track to the determined source directions 204. The tracking module 211 can determine the respective change-amounts based on a difference between each of the subsequently determined plurality of source directions 204 and a corresponding one of the plurality of tracking directions 212. In this way, each of the tracking directions 212 can be brought closer to a corresponding source direction 204, where a "corresponding" source direction can means the closest one. The source directions 204 can be considered as instantaneous values, and the tracking directions 212 can be considered as smoothed versions of the source directions 204. Such tracking is known in the art, especially in relation following the direction of moving sound sources. However, in the present examples, tracking is used to determine information about the acoustic environment around the microphones 202. For instance, such that unmoving sounds sources that are consistently generating sounds over a period of time can be identified and potentially attributed a relatively low score on the assumption that they are likely to be a television or radio (for example), rather than a target speaker that could say a wake word.

Beneficially, the tracking module 211 can determine the respective change-amounts based on: the difference between each of the subsequently determined plurality of source directions 204 and the corresponding one of the plurality of tracking directions 212; and/or any determined onset direction 206 that is associated with one of the source directions 204 or tracking directions 212. In this context, "associated with" can mean within a predetermined angle of a determined source direction 204/tracking direction 212 (e.g. less than 10 degrees away). If there is an association between the determined onset direction 206 and one of the source directions 204/tracking directions 212, then the tracking module 211 can apply a large multiplier to the difference to cause the tracking direction to quickly tend towards the source direction with the speech onset detected.

In this example, the one or more localization algorithms that are applied by the frame based DOA estimator 203 determine a strength-value (e.g., peaks of a phase search function that is applied by a localization algorithm) associated with each of the plurality of source directions. The tracking module 211 can then adjust each of the plurality of tracking directions 212 by a respective change-amount for a subsequently determined plurality of source directions 204. The tracking module 211 can determine the respective change-amounts based on: a difference between each of the subsequently determined plurality of source directions 204 and a corresponding one of the plurality of tracking directions 212; and also the strength-value corresponding to the associated one of the subsequently determined plurality of source directions 204. For instance, the tracking module 211 can apply a multiplier to the difference value to control how quickly the tracking directions 212 tend towards the source directions 204 such that a higher multiplier is used for subsequently determined source directions that have a high strength-value.

Frame DOAs Estimation

The frame based DOA estimator 203 can beneficially have low computational load when performing DOA estimation. Furthermore, DOA estimation can be performed for low SNR sound sources.

The frame based DOA estimator 203 can perform the frame based DOA estimation over a grid search based on a far-field propagation model. With a phase model based approach, resolution of the DOA is fixed by the definition of the search grid. A finer grid allows increased resolution of the DOA but at the expense of additional computational load.

For each microphone pair, the frame based DOA estimator 203 in this example computes a similarity measure between the cross spectrum phase and the theoretical phase model of the search grid. Time shift alignment is applied to each microphone pair relative to a reference one, and similarities per aligned pairs are summed such as to get one similarity measure relative to the theoretical phase model for each frequency bin and each angle of the grid.

In one example, peaks of the sum over frequencies are searched and a maximum number of I DOAs are estimated.

In another example, a maximum per frequency bin is computed to get a DOA per frequency bin, these DOAs are then sorted into a histogram whose bins correspond to the grid search. Spatial smoothing may be applied and a maximum of I peaks are searched to get I DOA estimates.

In some examples, the frequency bandwidth may be limited at relatively low frequencies due to the strong correlation of noise between microphones in very low frequencies. Additionally or alternatively, the frequency bandwidth may be limited at relatively high frequencies to limit the search below the spatial aliasing frequency. In this way, the processor 200 can apply the one or more localization algorithms to a defined frequency band of the plurality of sound signals in order to determine the plurality of source directions 204. This frequency band is defined by the microphone array topology, and includes part of the frequency band where speech signal has the most of its energy [300 Hz-4 kHz]. Nevertheless, spatial aliasing ambiguity can be reduced or overcome by summing over frequencies. Such summing over full frequency bandwidth can improve robustness and resolution.

Spatial noise floor, smoothed over time, is computed to remove spurious peaks in the phase search function.

Among the different possible DOA estimation techniques, a DOA estimation based on integrated cross spectrum can provide a good compromise between performance and computational load. Furthermore, such a technique can allows the DOA of a non-dominant source (e.g. SNR≤0 dB) to be estimated with a narrow beamwidth.

Figure 3:
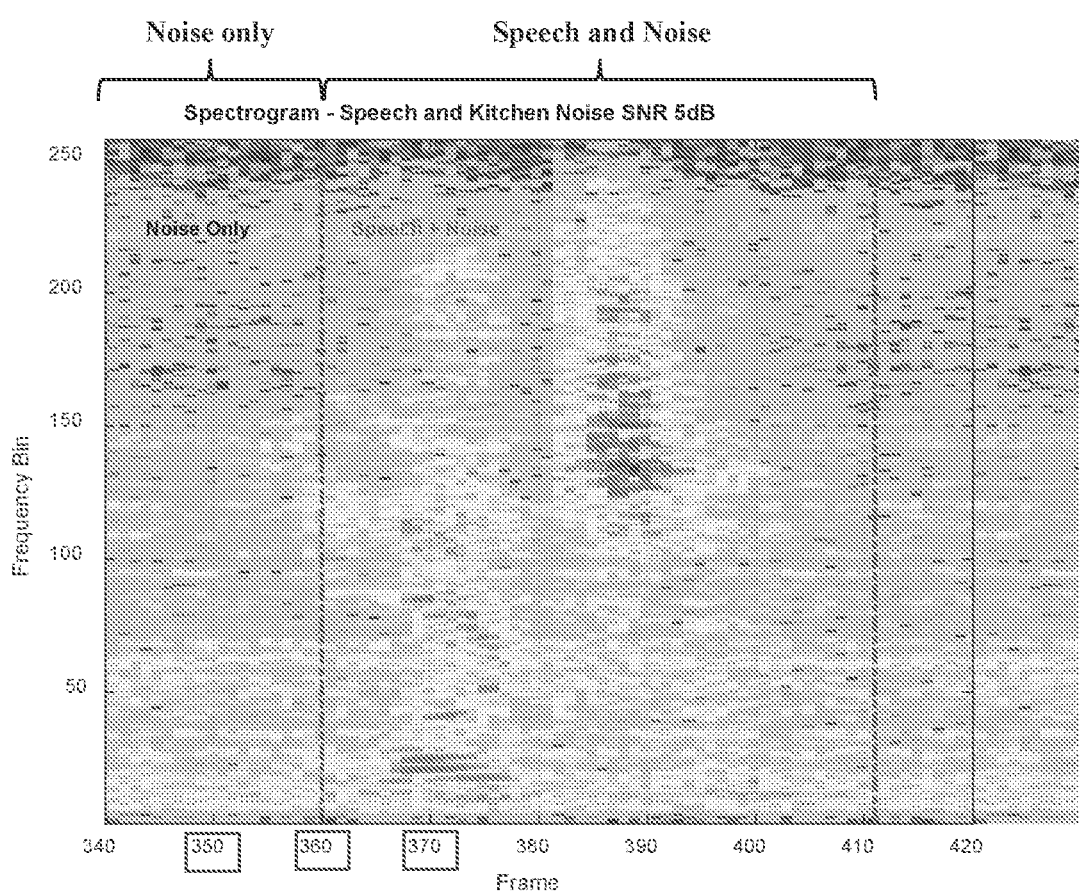
FIG. 3 shows a spectrogram of microphone sound signals that include a kitchen noise only period and a speech plus kitchen noise period.

FIG. 3 shows a spectrogram of microphone sound signals that include a noise only period, between frames 340 and 360, and a speech plus noise period between frames 360 and 410. In this example the noise is kitchen noise with a SNR of 5 dB.

The speech and noise sources are separated from each other by 45° (with respect to the microphones). The search grid used in this illustration, and the others in this document, has a 10° resolution so that an ambiguity of +/−1 DOA index may occur.

Figure 4:
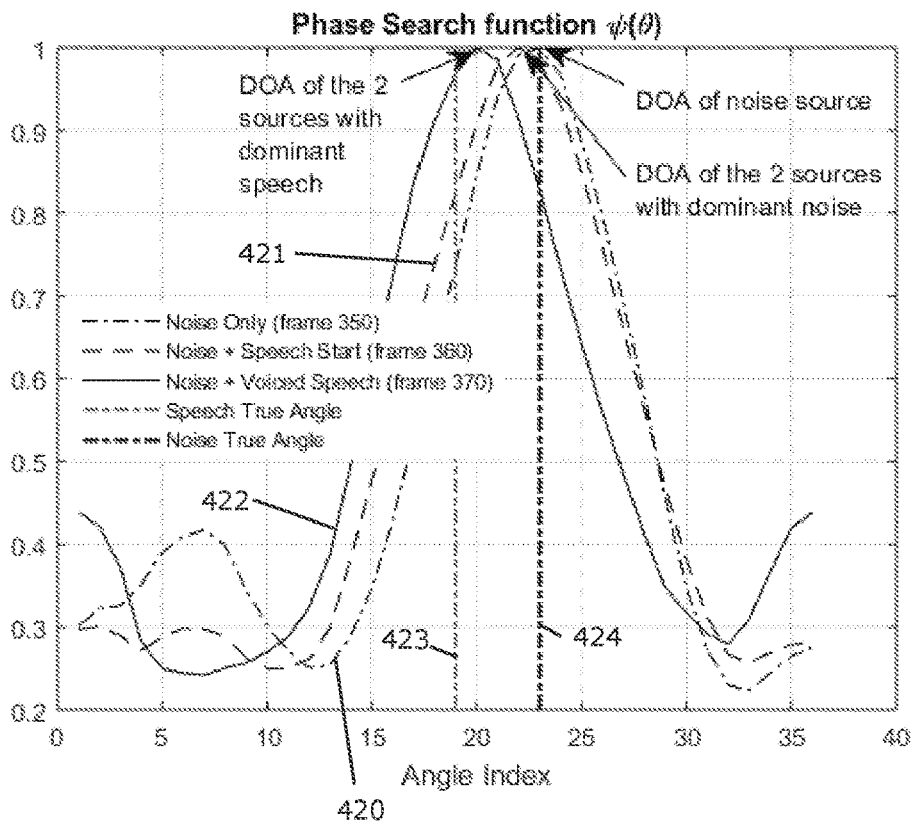
FIG. 4 shows peaks of a phase search function for a traditional SRP-PHAT localization algorithm, which identifies the dominant peak in the signalling of FIG. 3 at frames 350, 360 and 370.

FIG. 4 shows peaks of the phase search function for a traditional SRP-PHAT localization algorithm, which only identifies the dominant peak in the received signalling. The plots that are shown in FIG. 4 are the result of integrating across the spectrogram of FIG. 3 at the following frames:
 frame 350 (noise only) is shown with line 420;
 frame 360 (start of the speech in background noise) is shown with line 421; and
 frame 370 (dominant voiced speech in background noise) is shown with line 422.

FIG. 4 also shows the angle index for the true speech with vertical line 423, and the angle index for the true noise with vertical line 424.

The phase search function from the traditional SRP-PHAT DOA estimation method of FIG. 4 shows that:
 during the noise only period (at frame 350, line 420), there is one wide peak at the angle of the noise source 424;
 during the start of the overlap speech plus noise period (at frame 360, line 421), a slight shift of the peak towards the speech direction 423 is observed;
 during the dominant voiced speech (at frame 370, line 422), the peak is closer to the speech direction 423 because the speech has become the dominant source.

Due to the beam width of the beamformer, and because it is programmed to only look for the maximum power direction, the method that is illustrated in FIG. 4 can only perform correct localization of a single dominant sound source providing that the target and the interferer sound sources are distant enough from each other. If not, then the method identifies an angle value that is in between the true localizations of the two sound sources (this is a DOA resolution issue).

Figure 5:
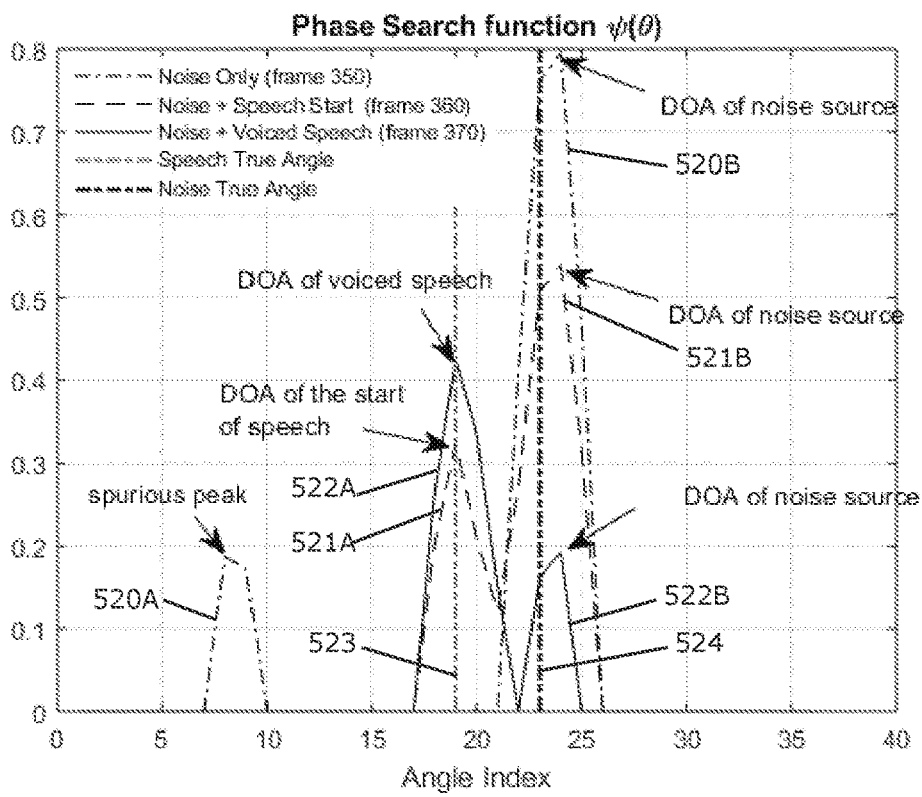
FIG. 5 shows the results of applying a localization algorithm that determines a plurality of source directions to the spectrum of FIG. 3, again at frames 350, 360 and 370.

FIG. 5 shows the results of applying a localization algorithm that determines a plurality of source directions to the spectrum of FIG. 3. FIG. 5 shows that, with the phase search function of the integrated cross spectrum, two distinct peaks appear, one for each of the sounds sources, appear immediately the start of the speech signal (at frame 360). More particularly:

during the noise only period (at frame 350), there is a dominant peak 520B at the angle of the noise source 524, and a spurious second peak 520A;

during the start of the overlap speech plus noise period (at frame 360), there is still a dominant peak 521B at the angle of the noise source 524, and there is a lower peak 521A at the angle of the speech source 524;

during the dominant voiced speech (at frame 370), the peak 522A at the angle of the speech source 524 is now the dominant peak and the peak 522B at the angle of the noise source 524 is lower.

Information about localization of both sound sources is therefore available in the speech plus noise period, starting at frame 360. As will be discussed below, a processor according to an embodiment of the present disclosure can associate the lower peak 521A at frame 360 with a target speaker, thereby enabling a beamformer to be directed at the speaker sooner than would be possible with the localization algorithm that is represented by FIG. 4.

Onset Detection

The onset of sound reveals the start of an acoustic event in a sound environment.

A Wake word speech event may occur without any prior knowledge of the location of the target speaker and without any prior speech being pronounced by the target speaker. In that case, onset of the wake word is the first speech content that is available for the DOA module to localize the target speaker.

A Voice Activity Detection (VAD) algorithm can be used to detect this speech event and compute a DOA for the signal. However, VAD can often fail to detect speech in non-stationary noise and/or at low SNRs. In that case, onset detection allows to focus a DOA search on that event.

Figure 6:
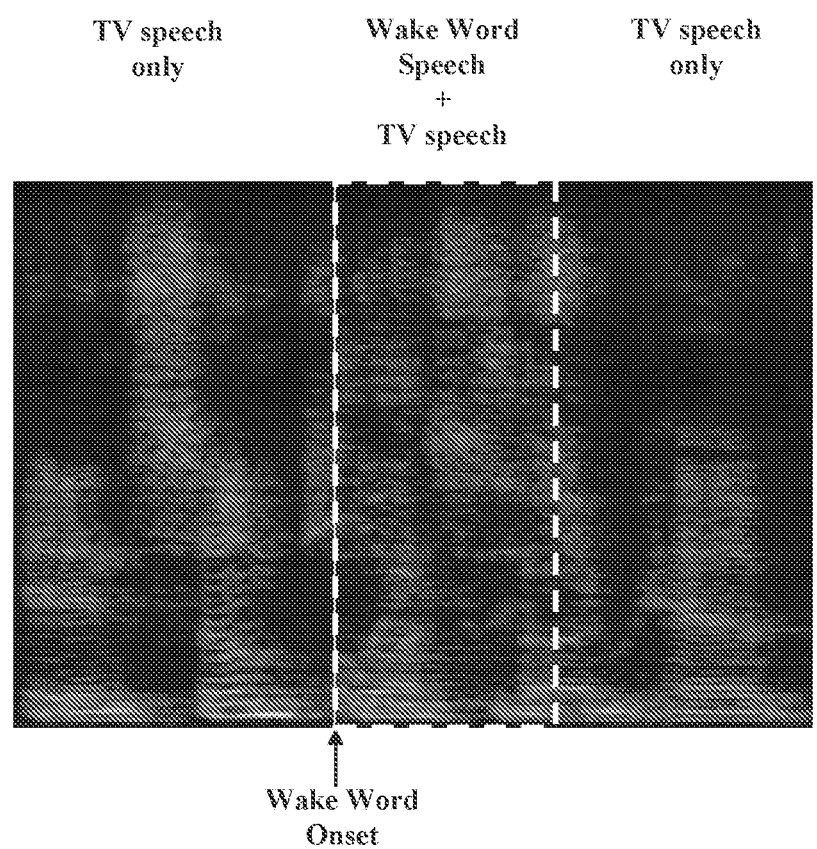
FIG. 6 shows an example of a spectrogram that illustrates wake word speech occurring during a continuous speech content from a TV sound source at 0 dB SNR.

FIG. 6 shows an example of a spectrogram that illustrates wake word speech occurring during a continuous speech content from a TV sound source at 0 dB SNR. FIG. 6 shows that it is very challenging to detect the target speaker speech from the TV speech.

Without the detection of onset DOA, DOA of target speech may be detected with delay, due to the overlapping sources and the need for the target speech to be the dominant sound source. Furthermore, the target speech may not be detected at low SNRs.

Advantageously, examples disclosed can use real time onset detection such that speech can be detected from a non-dominant sound source.

In a first example, onset detection is performed by envelope tracking based on the log of the cross power spectrum. Sudden increase in the log power spectrum magnitude over the smooth envelope is used to identify onset frequency bins.

In a second embodiment, normalization and compression at the output of a filter bank may be used to detect onset as it allows to emphasize onset.

Figure 7:
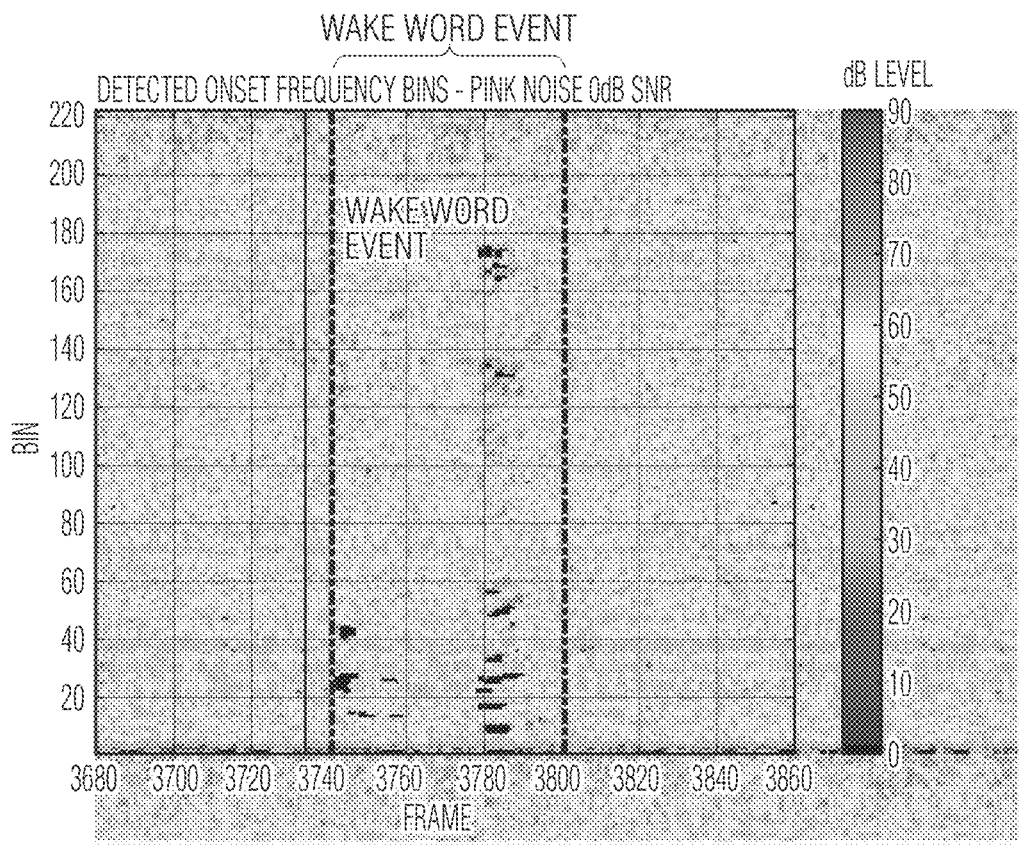
FIG. 7 shows a spectrogram of received sounds signals that include pink noise and the detected onset frequency bins.

FIG. 7 shows a spectrogram of received sounds signals. The spectrogram includes pink noise, and is labelled to indicate that a wake word event occurs between frames 3740 and 3800. The spectrogram shows that frequency bins belonging to the speech at the onset of the Wake word (frame 3740) are very few compared to the stationary pink noise at low SNR (here 0 dB). A traditional method (e.g. minima in the cost function of subspace methods, maximum output power of SRP-PHAT) would not be able to output the DOA of the target speaker at the start of the Wake word event. However, it has been found that the addition of the DOA computed from onset bins selection enables the DOA of the target speech to be detected at the start of the Wake word.

Figure 8:
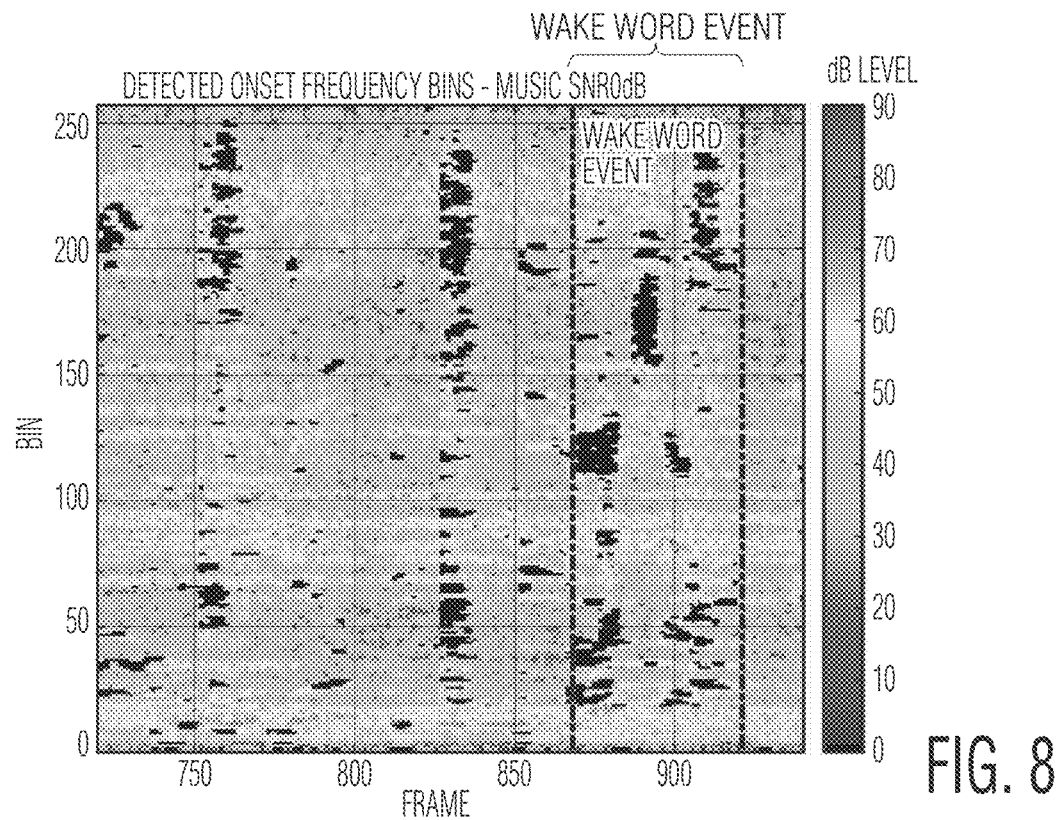
FIG. 8 shows a spectrogram of received sounds signals that include non-stationary noise and the detected onset frequency bins.

FIG. 8 shows a spectrogram of received sounds signals. The spectrogram includes music (as an example of non-stationary noise) and has a SNR of 0 dB. Areas of the spectrogram that are shown in black are detected onsets. In this example, a wake word event occurs between frames 830 and 940.

In the case of non-stationary noise, as shown in FIG. 8, onset frequency bins are also detected during noise only periods (before frame 840). However, as will be discussed below, looking at DOA on onset enables a target speaker to be accurately detected at the start of the Wake word.

Onset DOA

DOA estimation at the early start of the speech may be very challenging as it may concern only a few frequency bins of the speech plus noise spectrogram at low SNRs, and these bins may be considered below the spatial noise floor in the peak search DOA algorithm.

Therefore DOA is computed on a subset of the selected frequency bins that are detected as onset bins. Building a histogram over the grid search with these few frequency bins DOAs, and taking the maximum of it, is one way of estimating the onset direction (onset DOA).

In addition, reverberation, encountered in a targeted far-field environment, is known to be a limiting factor for DOA estimation algorithms. Onset, which identifies the start of an emitted speech signal, is less susceptible to reverberation than the rest of the following speech, such that calculating the DOA of a detected onset allows a more reliable onset DOA estimation.

Mapping to Tracks

In the context of the present disclosure, the idea of tracking is not to track moving sources, but it is to learn about the current acoustic environment such a spatially stationary sound sources can be distinguished from newly occurring sound sources.

As discussed above, a maximum of I DOA source directions (frame estimates) are uniquely mapped to I tracking direction (tracks). If onset is detected, the onset DOA is analysed by the tracking module 211. The onset DOA is either mapped to an existing frame DOA (a source direction or a tracking direction), such that the DOAs are fused, or it is considered as an additional frame DOA (again, a source direction or a tracking direction). In this last case, if the number n of estimated DOAs for the current frame is less than I, then the onset DOA is just added to the DOA list for the unique mapping to I tracking directions. Otherwise, further analysis of onset DOA and the existing tracking directions is performed in order to determine if a tracking direction (an estimated frame DOA) is associated with a determined onset direction (an estimated onset DOA).

Decision Based DOA

DOA estimation can minimize a cost function, or can determine the maximum output power over steering directions or the maximum of a similarity measure. In that case only a dominant source is detected, whereas the target speaker may not be the dominant source in a far-field noisy reverberant environment.

Over the I tracking directions that are provided by the tracking module 211, only one DOA must be output as the direction-output-signal 208 as a steering direction for the beamformer 209. The decision based DOA module 207 can detect which tracking direction 212 is the most relevant DOA for a current frame.

The tracking module 211 can enable the following to be identified/monitored:

i. A spatially stationary constant active source track: a DOA is nearly always mapped to this track at each frame over a long period, without any wake word detected. This track has low probability to belong to the target speaker and therefore can be attributed a relatively low score by the decision based DOA module 207. For example, the decision based DOA module 207 can reduce the score for a determined tracking direction 212 (or a source direction 204 if tracking is not used) if it has been recognised/unchanged for at least a minimum duration in a preceding period of time. In this context, "unchanged" can mean that it has not changed by at least a threshold amount, such as 5 degrees, 10 degrees or 20 degrees depending on the resolution of the tracking angle 212. Use of a "minimum duration in a preceding period of time", e.g. at least a few preceding seconds, can enable a noise from a stationary source (such as a television or a radio) that is not the target speaker to be identified. This is in contrast to a wake word event, which typically has a duration of less than 1 s.

ii. A spectrally stationary source track: a stationary sound source has a low onset rate estimate. For example, the decision based DOA module 207 can reduce the score for a determined tracking direction 212 if it has no or very few onset detections during the last few seconds of corresponding source activity, That is, if it has less than a threshold number of detected onsets in a preceding period of time.

iii. A track on which a Wake word has recently been detected, using feedback from the Wake word detector/engine 210. For example, the decision based DOA module 207 can fix the value of the direction-output-signal 208 for at least a minimum period of time in response to the Wake word detector 210 detecting a Wake word, or it can increase the score for the tracking direction 212 on which the direction-output-signal 208 is based in response to the Wake word detector 210 detecting a Wake word, iv. A track on which onset was recently detected and was given as the output DOA. For example, the decision based DOA module 207 can temporarily (e.g. for a predetermined period of time) increase the score for a tracking direction in response to an onset being detected in that direction (as determined by the onset detection module 205A and the onset DOA module 205B). This can assist with ensuring that the beamformer 209 is focused in a direction that is considered to have a reasonable probability of being a target speaker.

v. A track with quick DOA variations (no convergence to a localization) is considered noisy and free (diffuse noise, reverberation). The frame based DOA estimator 203 can output spurious DOA peaks. If the number of N found peaks is <I, the tracking module 211 can map a spurious DOA peak to a tracking direction 212. However, for such spurious peaks, at each frame the peak localization will vary. Also, the peak/strength value will be low. Therefore, the tracking direction 212 will never converge and it can be considered as a free track. If a tracking direction 212 has a status of a "free" then it can be used for another peak that subsequently occurs. The decision based DOA module 207 can be configured such that it does not provide the direction-output-signal 208 based on a free track. To this end, a free track can be given a null score such that it will not have the highest score. This is an example of a description of how the processor 200 can operate when mapping source directions 204 to tracking directions 212 when: the number N of peaks that are found by the frame based DOA estimator 203 is less than, or equal to, the number I of tracking directions 212.

Items i. and ii. correspond to sounds sources that are considered to have a high probability of being a noise source, which is why they are attributed low scores in this example.

Item iii. relates to the current tracking directions that should be maintained.

Item iv. relates to the identification of an onset direction that is considered likely to be the direction of a target speaker, in which case a timeout can be triggered by the detection of the onset event.

Item v. relates to what is considered as a free track, in which case a new source direction 204 (a new frame DOA estimate) can be mapped to the free track.

As set out above, if a Wake word has recently been detected and associated with a tracking direction 212 by the tracking module 211, then the decision based DOA module 207 may set the direction-output-signal 208 based on that tracking direction 212 and not allow a change to the direction-output-signal 208 for a limited period of time because a voice command is expected in the direction that is associated with the direction-output-signal 208. In this way, a timeout can be set on that tracking direction 212.

In some examples, a tracking direction 212 that corresponds to the dominant sound source will be set as the direction-output-signal 208, unless: a) the decision based DOA module 207 attributes a higher score to one of the other tracking directions, for instance in response to detecting an onset on one of the other tracking directions 212; and/or the b) the tracking direction 212 associated with the dominant source has been identified as likely to be a source of noise (for instance, as per items i, and ii. above) and one of the other tracking directions 212 has been attributed a higher score (and therefore is more likely to be associated with the target speaker).

In this way, the decision based DOA module 207 can give priority to a detected onset direction 206, unless it is mapped to a track identified as a constant active source track.

Advantageously, the decision based DOA module 207 can enable a fast change to the direction-output-signal 208 if the onset DOA module 205B provides a new onset direction 206 and it is not identified as a noisy track DOA. Additionally or alternatively, the decision based DOA module 207 can make a faster adaptation to a tracking direction 212 if an associated onset is detected, even if the peak of the phase search function that is applied by the frame based DOA estimator 203 for the corresponding source direction 204 is relatively low. This can all be accounted for by the tracking module 211 and/or decision based DOA module 207, which can generate the tracking directions 212 and/or attribute the scores based on the status of the current tracking directions 212 (e.g. noisy tracks, onset track, Wake word tracks, etc.).

Figure 9:
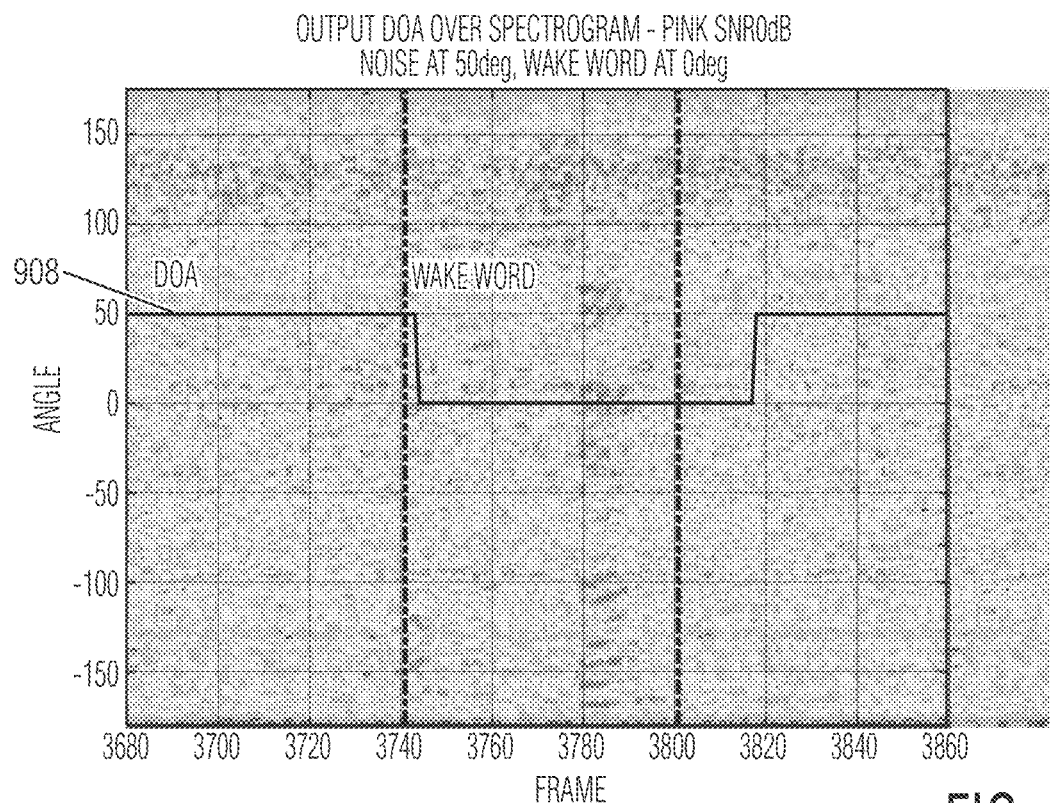
FIGS. 9, 10 and 11 show spectrograms that illustrate how a direction-output-signal can be correctly determined by the processor of FIG. 1 or FIG. 2 even in the presence of non-stationary noise and at low SNRs.
Figure 10:
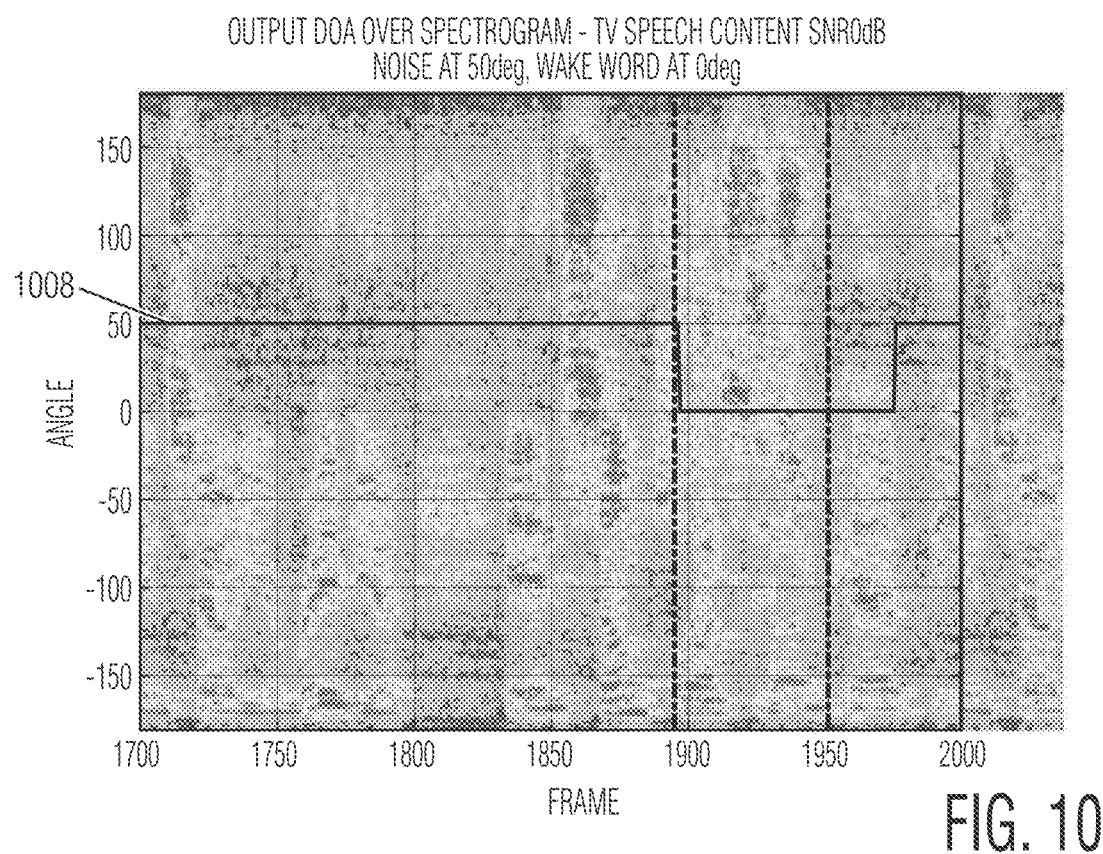
Figure 11:
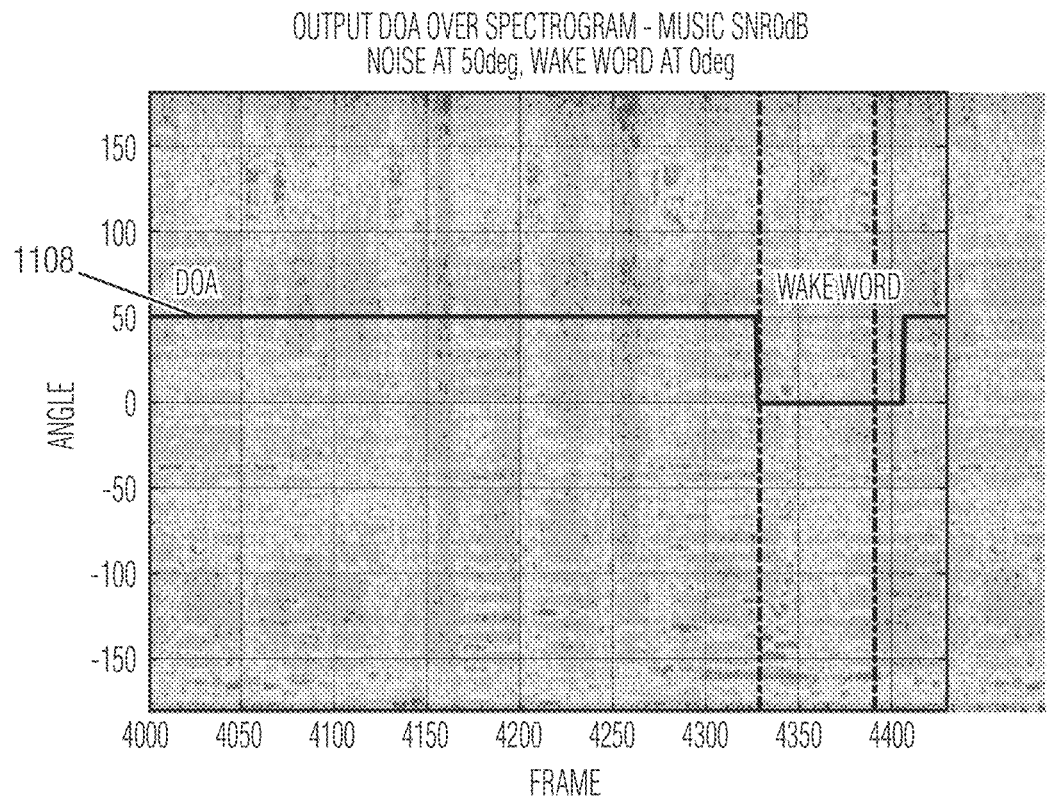

The tracking module 211 and/or the decision based DOA module 207 can progressively release a tracking direction tracking module 211 if no more DOAs are mapped to them, FIGS. 9 to 11 show spectrograms that illustrate how the direction-output-signal can be correctly determined by the processor of FIG. 1 or FIG. 2 even in the presence of non-stationary noise and at low SNRs. In these figures, output DOA as the steering direction is plotted over one microphone mixture (speech plus noise) spectrogram, FIG. 9 shows a spectrogram that includes pink noise at 0 dB SNR. A Wake word is detected between frames 3740 and 3800. The noise source is at an angle of 50 degrees, and the Wake word is spoken by a target speaker at 0 degrees. FIG. 9 also shows the direction-output-signal 908, and illustrates how it changes over time from frame to frame. It can be seen from FIG. 9 that the direction-output-signal 908 switches from the noise source (at 50 degrees) to the target speaker (at 0 degrees) very shortly after the Wake word begins at frame 3740. It can also be seen that the direction-output-signal 908 remains fixed on the target speaker, even after the Wake word event ends at frame 3800. This can be due to the decision based DOA module fixing the direction-output-signal 908 for at least a period of time after the detected onset and/or after detection of the Wake word.

FIG. 10 shows a spectrogram that includes TV speech content as noise at 0 dB SNR. A Wake word is detected between frames 1900 and 1950. The noise source is at an angle of 50 degrees, and the Wake word is spoken by a target speaker at 0 degrees. FIG. 10 also shows the direction-output-signal 1008. It can be seen from FIG. 10 that the direction-output-signal 1008 switches from the noise source (at 50 degrees) to the target speaker (at 0 degrees) very shortly after the Wake word begins at frame 1900.

FIG. 11 shows a spectrogram that includes music content as noise at 0 dB SNR. A Wake word is detected between frames 4330 and 4390. The noise source is at an angle of 50 degrees, and the Wake word is spoken by a target speaker at 0 degrees. FIG. 11 yet again shows that the direction-output-signal 1108 switches from the noise source (at 50 degrees) to the target speaker (at 0 degrees) very shortly after the Wake word begins at frame 4330.

Therefore, FIGS. 9 to 11 show that the processor of FIGS. 1 and 2 can accurately identify a target speaker in a variety of different noise scenarios.

Denoising for Wake Word Recognition

Onset of the wake word can be important for the detection by the wake word detector 210, so that at low SNRs, active noise reduction is desired at onset time. Also, a sudden change of background noise during the wake word may be detrimental to the functionality of the wake word detector 210.

The decision based DOA module 207 can provide a direction-output-signal 208 to the beamformer 209 in order to provide a steering direction that effectively has a look-ahead so that spatial noise reduction can be applied in the direction of the target speaker direction shortly before the occurrence of the wake word. An experimental delay of 100 ms was tested and it was found to satisfy delay requirements.

The ability of the processor 200 to catch the DOA of the target speaker (represented by the direction-output-signal 208) promptly at the occurrence of the onset allows any additional delay to be minimised or avoided, which can be important if statistics about the target speech are need to find the correct DOA. Moreover speech statistics can remain rather limited in the case of speech by a target speaker sentence that consists of only of a wake word followed by one voice command (e.g. "Hey Marvin, Stop") and may also be inaccurate in a reverberant noisy environment.

In an additional embodiment, as indicated above, a tracking strategy may be used to create a beamformer null at a tracking direction 212 that is considered as the localization of a directional noise source. This can achieve an increased noise reduction.

Figure 12:
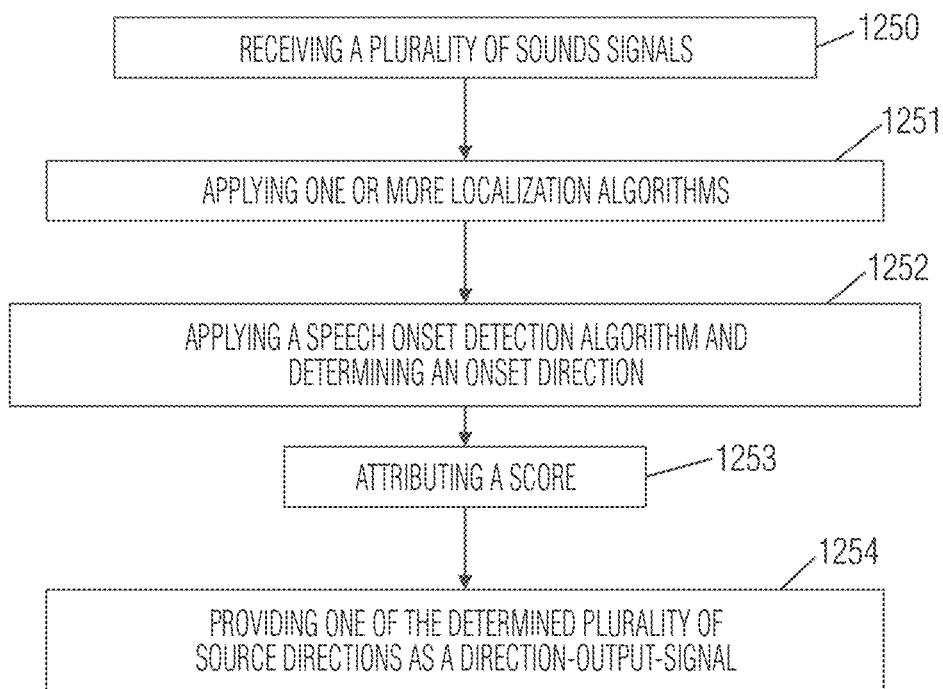
FIG. 12 shows an example embodiment of a method according to the present disclosure.

FIG. 12 shows an example embodiment of a method according to the present disclosure.

At step 1250, the method involves receiving a plurality of sounds signals from a respective plurality of microphones. At step 1251, the method applies one or more localization algorithms to the received plurality of sound signals in order to determine a plurality of source directions. As discussed above, the plurality of source directions each represent a direction from the microphones to the source of a detected sound.

At step 1252, the method includes applying a speech onset detection algorithm to the received plurality of sound signals and, in response to detecting a speech onset, determining an onset direction that represents the direction from the microphones to the source of the detected speech onset.

At step 1253, the method attributes a score to each of the determined plurality of source directions based on any determined onset directions. This can be performed according to any of the examples disclosed herein. At step 1254, the method provides one of the determined plurality of source directions as a direction-output-signal based on the attributed scores. As discussed above, the direction-output-signal can be provided to control the steering direction of a beamformer.

Examples described herein can be considered advantageous over a method that focuses on gathering speech statistics to improve robustness and resolution of a DOA estimation, which can rely on a VAD. In contrast, examples described herein aim to localize a short speech event using only a few features and no VAD. Rather than finding the DOA of a stable dominant speech source, methods described in this document can focus on identifying the DOA of new acoustic events in order to find the DOA of a brief speech burst, such as a wake word, which may occur only once in the acoustic scene.

Weighted DOA detection on the harmonics frequency bins of the higher power voiced part of the speech signal have been investigated, which requires enough speech time with voiced content and may not be robust to voice-like noise (e.g. as occurs if a television or radio is in the vicinity of the microphones). In the same way, selection of frequency bins for DOA estimation based on their power or on the probability of speech presence have been studied, which relies on a dominant source assumption and/or which is subjected to VAD errors, Instead, by spotting the DOA in onset bins, methods disclosed herein can catch a non-dominant speech source, whether an onset is voiced or not, and so it is able to solve the target speaker localization without delay at low SNRs and in reverberant environment. Robustness being increased as onset is less corrupted by reverberation.

In a traditional cross spectrum based method (GCC-PHAT, SRP-PHAT . . . ), a function of the source location is computed and this function shows peaks at source locations. There can be two issues with such methods: peak ambiguities in the search function (aliasing, noise, multi-path propagation) and masking of a low presence source by a dominant source. The combination of microphone pairs and summing over frequencies, together with DOA on detected onset frequency bins, as disclosed herein can reduce ambiguities and sharpen peaks in the DOA search function thereby increasing the resolution of the DOA.

In known DOA methods, traditional ones or even ones that use deep neural networks (DNNs), high power from a specific direction, most often combined with a VAD decision for traditional approaches, is the indicator of an active speaker in that direction. Such methods will not identify the target speaker direction in case of low SNRs. This is because the target speaker will be masked by more powerful sources. Examples disclosed herein are not power based (or at least not solely power based) such that they can identify the probable location of the target speaker by learning from the environment with a simple tracking strategy and from computing DOA on the onset of acoustic events. Although in other examples a power based approach can be used.

The tracking strategy and increased DOA resolution that are provided by the examples described herein can also allow the direction to a noise location to be determined, which can be used for further noise reduction capability.

The DOA algorithm that is implemented by the processors that are described herein can provide a low delay, computationally efficient, method which is able to localize a target speaker very quickly after she/he starts speaking, even if that speaker is only saying a short key word and is not the dominant source in a challenging acoustic environment that is corrupted by interfering noise and reverberation. The method can look for the DOA of new acoustics events such as to optimize the chance of the wake word detection. A combination of onset detection and simple tracking of sound sources can allow the speaker stating the wake word to be quickly localized, even at low SNRs and in a reverberant environment, thereby enabling effective denoising of the wake word without the need of speech presence probability estimation and dereverberation algorithm and with the need of only a few microphones.

Methods described herein can be particularly suitable for an Audio Front End of a Wake Word detection engine, followed by a recognition engine of voice commands or speech requests, where the aim is to get effective denoising at the Wake Word occurrence. Relevant products can include voice-enabled small devices: such as smart speakers, smart lights, smart home appliances, etc. The method can be used in small low cost devices with only 2 or 3 microphones.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A processor comprising:
inputs configured to receive a plurality of sounds signals from a respective plurality of microphones;
a localization module configured to apply one or more localization algorithms to the received plurality of sound signals in order to determine a plurality of source directions, wherein the plurality of source directions each represent a direction from the microphones to the source of a detected sound;
a tracking module configured to determine a plurality of tracking directions based on: current values for the determined plurality of source directions and previous values for the determined plurality of source directions;
an onset detection and Direction of Arrival (DOA) module configured to apply an onset detection algorithm to the received plurality of sound signals, and in response to detecting an onset the processor is configured to determine an onset direction that represents the direction from the microphones to the source of the detected onset; and a scoring and selection module configured to attribute a score to each of the determined plurality of tracking directions based on any of the determined onset directions, and provide the one of the determined plurality of tracking directions that has the highest score as a direction-output-signal.

2. The processor of claim 1, wherein the processor is configured to:
attribute a first score to a tracking direction that is associated with a determined onset direction; and
attribute a second score to a tracking direction that is not associated with a determined onset direction, wherein the first score is higher than the second score.

3. The processor of claim 1, wherein the direction-output-signal is for setting a steering direction for a beamformer.

4. The processor of claim 1, wherein the processor further comprises:
a beamformer that is configured to combine the received plurality of sound signals such that they are constructively combined in a direction that corresponds to the direction-output-signal in order to provide a beamformed-output-signal.

5. The processor of claim 4, wherein the processor further comprises:
a wake word detector that is configured to detect a wake word in the beamformed-output-signal.

6. The processor of claim 5, wherein the processor is configured to:
fix the value of the direction-output-signal for at least a minimum period of time in response to the wake word detector detecting a wake word.

7. The processor of claim 4, wherein:
the processor is further configured to provide the one of the determined plurality of tracking directions that has the lowest score as a second-direction-output-signal; and the beamformer is further configured to combine the received plurality of sound signals such that they are destructively combined in the direction that correspond to the second-direction-output-signal in order to provide the beamformed-output-signal.

8. The processor of claim 1, wherein the one or more localization algorithms are configured to:
determine cross power spectral density of the sound signals captured by pairs of the microphones; and
determine the plurality of source directions based on the minimum distance between observed and expected phase differences.

9. The processor of claim 1, wherein the processor is configured to apply the one or more localization algorithms to a defined frequency band of the plurality of sound signals in order to determine the plurality of source directions.

10. The processor of claim 1, configured to attribute the score to each of the determined plurality of tracking directions by:
determining a state for each tracking direction based on one or more of:
the presence or absence of an onset that is detected at an onset direction that corresponds to the tracking direction,
a strength-value associated with the tracking direction,
the stability of a source direction that is associated with the tracking direction,
the duration for which a tracking direction has been active,
the spectral components of the sound signals in the tracking direction, and
the presence or absence of a wake word in a beamformed-output-signal from a beamformer that is steered in line with the direction-output-signal;
wherein each state is associated with a score.

11. The processor of claim 1, wherein the processor is configured to:
adjust each of the plurality of tracking directions by a respective change-amount for a subsequently determined plurality of source directions, and
determine the respective change-amounts based on a difference between each of the subsequently determined plurality of source directions and a corresponding one of the plurality of tracking directions in order to bring each of the tracking directions closer to the corresponding subsequently determined source directions.

12. The processor of claim 11, wherein the processor is configured to:
determine the respective change-amounts based on:
the difference between each of the subsequently determined plurality of source directions and the corresponding one of the plurality of tracking directions, and
any determined onset direction that is associated with one of the source directions.

13. The processor of claim 1, wherein:
the one or more localization algorithms are configured to determine a strength-value associated with each of the plurality of source directions; and
the processor is configured to:
adjust each of the plurality of tracking directions by a respective change-amount for a subsequently determined plurality of source directions; and
determine the respective change-amounts based on:
a difference between each of the subsequently determined plurality of source directions and a corresponding one of the plurality of tracking directions, and
the strength-value corresponding with the associated one of the subsequently determined plurality of source directions.

14. The processor of claim 1, wherein the processor is configured to:
reduce the score for a determined tracking direction if it has been unchanged for at least a minimum duration in a preceding period of time.

15. A method comprising:
receiving a plurality of sounds signals from a respective plurality of microphones; applying one or more localization algorithms to the received plurality of sound signals in order to determine a plurality of source directions, wherein the plurality of source directions each represent a direction from the microphones to the source of a detected sound;
determining a plurality of tracking directions based on: current values for the determined plurality of source directions; and previous values for the determined plurality of source directions;
applying a speech onset detection algorithm to the received plurality of sound signals and, in response to detecting a speech onset, determining an onset direction that represents the direction from the microphones to the source of the detected speech onset;
attributing a score to each of the determined plurality of tracking directions based on any of the determined onset directions; and
providing the one of the determined plurality of tracking directions that has the highest score as a direction-output-signal.

16. The method of claim 15, further comprising:
attributing a first score to a tracking direction that is associated with a determined onset direction; and
attributing a second score to a tracking direction that is not associated with a determined onset direction, wherein the first score is higher than the second score.

17. The method of claim 15, wherein the direction-output-signal is for setting a steering direction for a beamformer.

18. The method of claim 15, wherein attributing the score to each of the determined plurality of tracking directions comprises:
- determining a state for each tracking direction based on one or more of:
- the presence or absence of an onset that is detected at an onset direction that corresponds to the tracking direction,
- a strength-value associated with the tracking direction,
- the stability of a source direction that is associated with the tracking direction,
- the duration for which a tracking direction has been active,
- the spectral components of the sound signals in the tracking direction, and
- the presence or absence of a wake word in a beamformed-output-signal from a beamformer that is steered in line with the direction-output-signal;
- wherein each state is associated with a score.

* * * * *